United States Patent [19]

Li et al.

[11] Patent Number: 5,864,560
[45] Date of Patent: Jan. 26, 1999

[54] METHOD AND APPARATUS FOR MODE SWITCHING IN A VOICE OVER DATA COMPUTER-BASED PERSONAL COMMUNICATIONS SYSTEM

[75] Inventors: Ping Li, New Brighton; Raghu N. Sharma, North Oaks; Jeffrey P. Davis, Ham Lake; Timothy D. Gunn, Mounds View, all of Minn.

[73] Assignee: Multi-Tech Systems, Inc., Mounds View, Minn.

[21] Appl. No.: 808,015

[22] Filed: Mar. 3, 1997

Related U.S. Application Data

[63] Continuation of Ser. No. 499,675, Jul. 7, 1995, abandoned, which is a continuation-in-part of Ser. No. 346,421, Nov. 29, 1994, Pat. No. 5,546,395, which is a continuation-in-part of Ser. No. 271,496, Jul. 7, 1994, Pat. No. 5,617,423, which is a continuation-in-part of Ser. No. 161,915, Feb. 3, 1993, Pat. No. 5,453,986, which is a continuation-in-part of Ser. No. 142,087, Oct. 28, 1993, Pat. No. 5,450,320, which is a continuation-in-part of Ser. No. 2,467, Jan. 8, 1993, Pat. No. 5,452,289.

[51] Int. Cl.$^6$ ........................................................ H04J 3/12
[52] U.S. Cl. ............................ 370/465; 370/522; 375/222
[58] Field of Search .................................... 370/276, 286, 370/288, 289, 290, 465, 468, 470, 472, 477, 535, 525, 526, 522, 538; 375/222

[56] References Cited

U.S. PATENT DOCUMENTS

| Re. 34,034 | 8/1992 | O'Sullivan | 379/59 |
|---|---|---|---|
| 3,304,372 | 2/1967 | Filipowsky et al. | 179/2 |
| 3,789,165 | 1/1974 | Campanella | 179/170.2 |
| 3,904,830 | 9/1975 | Every, Sr. et al. | 179/18 |
| 3,973,081 | 8/1976 | Hutchins | 179/1 SA |
| 3,997,732 | 12/1976 | Every, Sr. et al. | 179/18 |
| 4,100,377 | 7/1978 | Flanagan | 179/15 |
| 4,107,471 | 8/1978 | Reed | 370/81 |
| 4,205,202 | 5/1980 | Kahn | 370/81 |

(List continued on next page.)

FOREIGN PATENT DOCUMENTS

| 0 429 054 A3 | 5/1991 | European Pat. Off. . |
|---|---|---|
| WO 91/07044 | 5/1991 | European Pat. Off. . |
| 0 443 548 A3 | 8/1991 | European Pat. Off. . |
| 488865A2 | 6/1992 | European Pat. Off. . |

(List continued on next page.)

OTHER PUBLICATIONS

V. Cuperman, et al., *Backward Adaptive Configurations For Low–Delay Vector Excitation Coding, Advances In Speech Coding,* pp. 13–23, dated Jan. 1, 1991.

Copy of European Search Report dated Apr. 18, 1996 by S. Lambley for Application No. EP 93403164 (5 pages).

Copy of PCT Search Report dated May 24, 1996 by C. Canosa Areste for Application No. PCT/US 95/14253 (6 pages).

IBM Technical Disclosure Bulletin, *Method and Apparatus for the Statistical Multiplexing of Voice, Data, and Image Signals,* 35, No. 5, pp. 409–411, dated Nov., 1992.

(List continued on next page.)

*Primary Examiner*—Chau Nguyen
*Attorney, Agent, or Firm*—Schwegman, Lundberg, Woessner & Kluth, P.A.

[57] ABSTRACT

A personal communications system enables the operator to simultaneously transmit voice and data communication to a remote site. The personal communications system is equipped with two telephone line interfaces to allow connection between two remote sites. The connection between the first remote site and the second remote site may operate in an analog voice mode, a digital data communications mode, and a voice over data communications mode. A switch between analog voice mode and digital data communications mode and analog voice mode and voice over data communications mode is performed using switching tones, including calling tones, answer tones, and DTMF tones. Hardware and software switches are also used to program the modems in the personal communication systems for originating and answering modes.

11 Claims, 10 Drawing Sheets

U.S. PATENT DOCUMENTS

| | | | |
|---|---|---|---|
| 4,284,850 | 8/1981 | Clingenpeel | 370/81 |
| 4,354,273 | 10/1982 | Araseki et al. | 375/84 |
| 4,377,860 | 3/1983 | Godbole | 370/84 |
| 4,403,322 | 9/1983 | Kato et al. | 375/1 |
| 4,425,661 | 1/1984 | Moses et al. | 375/1 |
| 4,445,213 | 4/1984 | Baugh et al. | 370/94 |
| 4,476,559 | 10/1984 | Brolin et al. | 370/110.1 |
| 4,479,195 | 10/1984 | Herr et al. | 364/900 |
| 4,479,213 | 10/1984 | Galand et al. | 370/118 |
| 4,495,620 | 1/1985 | Steele et al. | 370/118 |
| 4,500,987 | 2/1985 | Hasegawa | 370/60 |
| 4,524,244 | 6/1985 | Faggin et al. | 370/2 |
| 4,534,024 | 8/1985 | Maxemchuk et al. | 370/85 |
| 4,546,212 | 10/1985 | Crowder, Sr. | 179/2 |
| 4,578,537 | 3/1986 | Faggin et al. | 179/2 |
| 4,587,651 | 5/1986 | Nelson et al. | 370/88 |
| 4,593,389 | 6/1986 | Wurzburg et al. | 370/110.1 |
| 4,598,397 | 7/1986 | Nelson et al. | 370/110.1 |
| 4,609,788 | 9/1986 | Miller et al. | 179/170.6 |
| 4,610,022 | 9/1986 | Kitayama et al. | 381/36 |
| 4,622,680 | 11/1986 | Zinser | 375/25 |
| 4,629,829 | 12/1986 | Puhl et al. | 379/58 |
| 4,652,703 | 3/1987 | Lu et al. | 379/339 |
| 4,660,218 | 4/1987 | Hashimoto | 379/93 |
| 4,670,874 | 6/1987 | Sato et al. | 370/110.1 |
| 4,697,281 | 9/1987 | O'Sullivan | 379/59 |
| 4,700,341 | 10/1987 | Huang | 370/80 |
| 4,707,831 | 11/1987 | Weir et al. | 370/80 |
| 4,718,082 | 1/1988 | Parker et al. | 379/88 |
| 4,740,963 | 4/1988 | Eckley | 370/110.1 |
| 4,750,169 | 6/1988 | Carse et al. | 370/109 |
| 4,751,510 | 6/1988 | De Saint Michel et al. | 340/825.07 |
| 4,751,736 | 6/1988 | Gupta et al. | 379/31 |
| 4,757,527 | 7/1988 | Beniston et al. | 379/410 |
| 4,764,955 | 8/1988 | Galand et al. | 379/411 |
| 4,794,595 | 12/1988 | Ohyama . | |
| 4,807,250 | 2/1989 | Tanaka | 375/28 |
| 4,809,271 | 2/1989 | Kondo et al. | 370/110.1 |
| 4,813,040 | 3/1989 | Futato | 370/111 |
| 4,827,085 | 5/1989 | Yaniv et al. | 370/18 |
| 4,835,765 | 5/1989 | Bergmans et al. | 370/32.1 |
| 4,839,802 | 6/1989 | Wonak et al. | 364/200 |
| 4,845,746 | 7/1989 | Li | 379/411 |
| 4,847,900 | 7/1989 | Wakim | 379/424 |
| 4,862,449 | 8/1989 | Hoefkens et al. | 370/32.1 |
| 4,864,559 | 9/1989 | Perlman . | |
| 4,866,732 | 9/1989 | Carey et al. | 375/1 |
| 4,873,715 | 10/1989 | Shibata | 379/93 |
| 4,887,265 | 12/1989 | Felix | 370/94.1 |
| 4,890,282 | 12/1989 | Lambert et al. | 370/79 |
| 4,890,316 | 12/1989 | Walsh et al. | 379/98 |
| 4,901,333 | 2/1990 | Hodgkiss | 375/79 |
| 4,905,282 | 2/1990 | McGlynn et al. | 380/48 |
| 4,912,756 | 3/1990 | Hop | 379/60 |
| 4,912,758 | 3/1990 | Arbel | 379/388 |
| 4,914,650 | 4/1990 | Sriram | 370/60 |
| 4,926,448 | 5/1990 | Kraul et al. | 375/121 |
| 4,932,048 | 6/1990 | Kenmochi et al. | 379/67 |
| 4,935,954 | 6/1990 | Thompson et al. | 379/89 |
| 4,942,569 | 7/1990 | Maeno | 370/60 |
| 4,953,210 | 8/1990 | McGlynn et al. | 380/48 |
| 4,965,789 | 10/1990 | Bottau et al. | 370/79 |
| 4,972,457 | 11/1990 | O'Sullivan | 379/59 |
| 4,972,462 | 11/1990 | Shibata | 379/89 |
| 4,972,483 | 11/1990 | Carey | 381/31 |
| 4,977,591 | 12/1990 | Chen et al. | 379/410 |
| 4,991,169 | 2/1991 | Davis et al. | 370/77 |
| 4,995,059 | 2/1991 | Ishikawa | 375/27 |
| 4,998,241 | 3/1991 | Brox et al. | 370/32.1 |
| 5,001,710 | 3/1991 | Gawrys et al. | 370/110.1 |
| 5,001,745 | 3/1991 | Pollock | 375/1 |
| 5,005,183 | 4/1991 | Carey et al. | 375/1 |
| 5,008,901 | 4/1991 | Wallach et al. | 375/8 |
| 5,008,926 | 4/1991 | Misholi | 379/89 |
| 5,014,232 | 5/1991 | Andre | 370/109 |
| 5,020,058 | 5/1991 | Holden et al. | 370/109 |
| 5,025,443 | 6/1991 | Gupta | 370/76 |
| 5,036,513 | 7/1991 | Greenblatt | 370/125 |
| 5,044,010 | 8/1991 | Frenkiel et al. | 379/61 |
| 5,046,188 | 9/1991 | Molnar | 379/94 |
| 5,051,720 | 9/1991 | Kittirutsunetorn | 340/310 |
| 5,062,133 | 10/1991 | Melrose | 379/94 |
| 5,065,395 | 11/1991 | Shenoi et al. | 370/81 |
| 5,065,425 | 11/1991 | Lecomte et al. | 379/93 |
| 5,081,647 | 1/1992 | Bremer | 375/5 |
| 5,083,310 | 1/1992 | Drory | 381/30 |
| 5,086,471 | 2/1992 | Tanaka et al. | 381/36 |
| 5,099,472 | 3/1992 | Townsend et al. | 370/32.1 |
| 5,107,519 | 4/1992 | Townsend et al. | 370/32.1 |
| 5,115,429 | 5/1992 | Hluchyj et al. | 370/84 |
| 5,121,385 | 6/1992 | Tominaga et al. | 370/80 |
| 5,127,001 | 6/1992 | Steagall et al. | 370/62 |
| 5,127,041 | 6/1992 | O'Sullivan | 379/59 |
| 5,132,966 | 7/1992 | Hayano et al. | 370/79 |
| 5,136,586 | 8/1992 | Greenblatt | 370/110.4 |
| 5,138,662 | 8/1992 | Amano et al. | 381/36 |
| 5,146,470 | 9/1992 | Fujii et al. | 375/103 |
| 5,150,410 | 9/1992 | Bertrand | 380/28 |
| 5,151,937 | 9/1992 | Chujo et al. | 379/410 |
| 5,153,897 | 10/1992 | Sumiyoshi et al. | 375/8 |
| 5,162,812 | 11/1992 | Aman et al. | 375/34 |
| 5,164,982 | 11/1992 | Davis | 379/96 |
| 5,177,734 | 1/1993 | Cummiskey et al. | 370/32.1 |
| 5,182,762 | 1/1993 | Shirai et al. | 375/122 |
| 5,187,591 | 2/1993 | Guy et al. | 358/425 |
| 5,187,692 | 2/1993 | Haneda et al. | 367/135 |
| 5,193,110 | 3/1993 | Jones et al. | 379/94 |
| 5,195,130 | 3/1993 | Weiss et al. | 379/98 |
| 5,208,812 | 5/1993 | Dudek et al. | 370/100.1 |
| 5,208,850 | 5/1993 | Kino | 379/88 |
| 5,214,656 | 5/1993 | Chung et al. | 371/43 |
| 5,228,026 | 7/1993 | Albrow et al. | 370/29 |
| 5,233,660 | 8/1993 | Chen | 381/38 |
| 5,235,595 | 8/1993 | O'Dowd | 370/94.1 |
| 5,249,218 | 9/1993 | Sainton | 379/59 |
| 5,258,983 | 11/1993 | Lane et al. | 370/118 |
| 5,261,027 | 11/1993 | Taniguchi et al. | 395/2 |
| 5,263,019 | 11/1993 | Chu | 370/32.1 |
| 5,272,695 | 12/1993 | Makino et al. | 370/32.1 |
| 5,276,703 | 1/1994 | Budin et al. | 375/1 |
| 5,278,900 | 1/1994 | Van Gerwen et al. | 379/410 |
| 5,279,203 | 1/1993 | Gautier et al. . | |
| 5,282,197 | 1/1994 | Kreitzer | 370/76 |
| 5,283,638 | 2/1994 | Engberg et al. | 348/14 |
| 5,283,819 | 2/1994 | Glick et al. | 379/80 |
| 5,289,539 | 2/1994 | Maruyama | 379/410 |
| 5,295,136 | 3/1994 | Ashley et al. | 370/32.1 |
| 5,305,312 | 4/1994 | Fornek et al. | 370/62 |
| 5,307,413 | 4/1994 | Denzer | 380/49 |
| 5,309,562 | 5/1994 | Li | 395/200 |
| 5,313,498 | 5/1994 | Sano | 375/103 |
| 5,317,604 | 5/1994 | Osterweil | 375/122 |
| 5,319,682 | 6/1994 | Clark | 375/122 |
| 5,327,520 | 7/1994 | Chen | 395/2.28 |
| 5,329,472 | 7/1994 | Sugiyama | 364/724.19 |
| 5,341,374 | 8/1994 | Lewen et al. | 370/85.4 |
| 5,343,473 | 8/1994 | Cidon et al. | 370/85.6 |
| 5,343,521 | 8/1994 | Jullien et al. | 379/410 |
| 5,355,365 | 10/1994 | Bhat et al. | 370/85.13 |
| 5,365,577 | 11/1994 | Davis et al. | 379/96 |
| 5,371,853 | 12/1994 | Kao et al. | 395/2.32 |
| 5,379,340 | 1/1995 | Overend et al. | 379/93 |

| | | | |
|---|---|---|---|
| 5,381,412 | 1/1995 | Otani | 370/84 |
| 5,384,780 | 1/1995 | Lomp et al. | 375/222 |
| 5,390,239 | 2/1995 | Morris et al. | 379/93 |
| 5,390,250 | 2/1995 | Janse et al. | 379/410 |
| 5,402,474 | 3/1995 | Miller et al. | 379/93 |
| 5,406,557 | 4/1995 | Baudoin et al. | 370/61 |
| 5,406,560 | 4/1995 | Kondo et al. | 370/94.1 |
| 5,414,796 | 5/1995 | Jacobs | 395/2.3 |
| 5,416,776 | 5/1995 | Panzarella et al. | 370/85.11 |
| 5,438,614 | 8/1995 | Rozman et al. | 379/93 |
| 5,444,770 | 8/1995 | Davis et al. | 379/99 |
| 5,463,616 | 10/1995 | Kruse et al. | 30/24 |
| 5,471,470 | 11/1995 | Sharma et al. | 370/81 |
| 5,472,351 | 12/1995 | Greco et al. | 439/353 |
| 5,473,676 | 12/1995 | Frick et al. | 375/222 |
| 5,479,407 | 12/1995 | Ko et al. | 370/94.1 |
| 5,479,475 | 12/1995 | Grobe et al. | 379/58 |
| 5,490,060 | 2/1996 | Malec et al. | 364/401 |
| 5,493,609 | 2/1996 | Winseck, Jr. et al. | 375/222 |

FOREIGN PATENT DOCUMENTS

| | | |
|---|---|---|
| 0 510 411 A3 | 10/1992 | European Pat. Off. . |
| 0 526 104 A2 | 2/1993 | European Pat. Off. . |
| 0 581 528 A1 | 2/1994 | European Pat. Off. . |
| 0 582 537 A2 | 2/1994 | European Pat. Off. . |
| 0 582 537 A3 | 2/1994 | European Pat. Off. . |
| 0 60 286 A2 | 4/1994 | European Pat. Off. ....... H04M 11/06 |
| 0 614 305 A3 | 9/1994 | European Pat. Off. . |
| 3504064 | 8/1986 | Germany . |
| 3630469 | 3/1988 | Germany . |
| 3409532 | 4/1989 | Germany . |
| 63-054052 | 8/1988 | Japan . |
| 193489 | 7/1990 | Japan . |
| 257748 | 10/1990 | Japan . |
| 3162052 | 7/1991 | Japan . |
| 2210237 | 1/1989 | United Kingdom . |
| 2 260 670 | 4/1993 | United Kingdom . |
| 2 268 663 | 1/1994 | United Kingdom . |
| WO 92/06550 | 4/1992 | WIPO . |
| WO 92/20028 | 11/1992 | WIPO . |
| WO 93/11643 | 6/1993 | WIPO . |
| WO 93/22869 | 11/1993 | WIPO . |
| WO 94/26056 | 11/1994 | WIPO . |

OTHER PUBLICATIONS

IBM Technical Disclosure Bulletin, *Speech Data Adaptive Multiplexer,* 27, No. 2, p. 969, dated Jul., 1994.
Copy of PCT Search Report dated Apr. 25, 1996 by Areste Canosa for Application No. PCT/US95/05034 (8 pages).
Copy of PCT Search Report dated Apr. 10, 1996 by J. Lange for Application No. PCT/US95/14826 (7 pages).
Copy of PCT Search Report dated Mar. 28, 1996 by M. Vandevenne for Application No. PCT/US95/14829 (8 pages).
Canadian Application No. 2,104,701, *Computer–Based Multifunction Personal Communications System,* pp. 1–105, and 52 sheets of drawings, dated Jul. 9, 1994.
AT&T Microelectronics, "High Speed Data Pump Chip Sets," published in Dec. 1991.
AT&T Microelectronics, "We DSP16C Digital Signal Processor/CODEC Preliminary Data Sheet," 32 pages, published in May, 1991.
AT&T Microelectronics, "T7540 Digital Telephone CODEC Data Sheet Addendum," pp. 1–4 published in Jul., 1991.
AT&T Microelectronics, "T7540 Digital Telephone CODEC Preliminary Data Sheet," pp. 1–64, published in Jan., 1991.
Zilog Intelligent Peripheral Controllers, "Z84C01 Z80 CPU with Clock Generator/Controller," pp. 43–73, published in 1991.
Zilog Intelligent Peripheral Controllers, "Z84C90 CMOS Z80 KIO Serial/Parallel/counter/timer," pp. 205–224, published in 1991.
U.S. West Caller ID publication, received Jul. 18, 1994, one page.
J.D. Mills, et al., "A Data and Boice System for the General Service Telephone Network," *IECON,* pp.1143–1148, 1987.
Copy of European Search Report (Application No. EP 94304742), completed Jun. 8, 1995 by Examiner Mikkelsen.
"TechTips –A Periodic Round–up of Technical Applications, Notes, and Information on MultiTech's Data Communications Products" by MultiTech Systems, vol. 2, No. 2, May 1992.
"MultiX25 –X.25 PAD, The New MultiX25 PAD 8 Port X.25 Packet Assembler/Disassembler for Public and Private Data Networks," by MultiTech Systems, Mar. 1992.
Y. Akaiwa, et al., "An Integrated Voice and Data Radio Access System," 1992, pp. 255–258, IEEE.
CCITT, V.42, "Error–Correcting Procedures for DCES Using Asynchronous–to–Synchronous Conversion", vol. VIII, pp. 296–370, dated 1988.
European Search Report for Application No. EP 93403164 completed on Sept. 21, 1995 by Examiner Lambley; 4 pages.
S. Casale et al., Statistical Voice/High–Speed Data Multiplexing on a 64 KBIT/S Channel, *IEEE,* pp. 459–464, dated 1991.
T. Komiya et al, "An Approach to the Multifunction Graphic Terminal for the ISDN Enviroment", IEEE, pp. 32–36, dated 1988.
D. Gulick et al., "Interface for the ISDN to Your PC with A Voice/Data Board", *Electronic Design,* pp. 85–88, dated Dec. 10, 1987.
S. Sasaki et al., "Variable Rate Voice Coding System", *IEEE,* pp.364–367, dated 1992.
"Video Calls Use Basic Phone Lines", Mitch Radcliffe, *Macweek,* (Aug. 3, 1992).
"Radish System Lets Phone Users Send Voice, Data Simultaneously", *PC Week,* 9, 19, p. 53, (May 11, 1992).
"Don't Just Tell Them, Show Them!", Glenn A. Pierce, Jr., *Automation,* (Aug. 1990).
"Mitsubishi Still Color Picture TV Phone", *Techno Japan,* 23, 6, (Jun. 1990).
"The Photophone", (Product Brochure) GTE (Feb. 15, 1990).
"Wrist TVs Still Fiction, but Police Videophones Take Hold", Ray Smith, *TE&M,* (Dec. 15, 1987).
"Audiographic Terminal", M. Laube, *Electrical Communication,* 60, 1 (1986).
"Comparison of Coding Schemes for Telewriting Systems", Tominaga et al., *ICCC,* (1986).
"Simultaneous Transmission of Voice and Handwriting Signals: Sketchphone System", Kishimoto et al., *IEEE,* (1981).
"Telewriting Terminal Equipment", (Recommendation T.150) *CCITT,* (1988).
"A Family of 2–Wire, Duplex Modems Operating at Data Signalling Rates . . . ", *Facsimile Recommendation V.32 CCITT,* (1988).
"*** PICFON Card Brochure", Specom Technologies Corp., (Published Prior to Applicant's Invention).
Pen Telephone Brochure, Shimadzu, (Published Prior to Applicant's Invention).
"Telewriter Product Description", Optel Communications Inc., (Published Prior to Applicant's Invention).
"Videowriter 1991 Product Description", Optel Communications, Inc., (1991).
Copy of PCT Search Report for Application Serial No. PCT/US 96/11313 completed on Nov. 7, 1996, by C. Mikkelsen, 4 pages.

METHOD AND APPARATUS FOR MODE SWITCHING IN A VOICE OVER DATA COMPUTER-BASED PERSONAL COMMUNICATIONS SYSTEM

This is a continuation of U.S. patent application Ser. No. 08/499,675, filed on Jul. 7, 1995, now abandoned, which is a Continuation-In-Part of U.S. patent application Ser. No. 08/346,421 filed Nov. 29, 1994, now U.S. Pat. No. 5,546,395, entitled "DYNAMIC SELECTION OF COMPRESSION RATE FOR A VOICE COMPRESSION ALGORITHM IN A VOICE OVER DATA MODEM", the complete application of which is incorporated by reference, which application is also a Continuation-In-Part of U.S. patent application Ser. No. 08/271,496 filed Jul. 7, 1994, now U.S. Pat. No. 5,617,423, entitled "VOICE OVER DATA MODEM WITH SELECTABLE VOICE COMPRESSION", the complete application of which is incorporated by reference, which application is also a Continuation-In-Part of U.S. patent application Ser. No. 08/161,915 filed Feb. 3, 1993, now U.S. Pat. No. 5,453,986, entitled "DUAL PORT INTERFACE FOR A COMPUTER-BASED MULTIFUNCTION PERSONAL COMMUNICATIONS SYSTEM", the complete application of which is hereby incorporated by reference, which application is also a Continuation-In-Part of U.S. patent application Ser. No. 08/142,087 filed Oct. 28, 1993, now U.S. Pat. No. 5,450,320, entitled "RINGDOWN AND RINGBACK SIGNALLING FOR A COMPUTER-BASED MULTIFUNCTION PERSONAL COMMUNICATIONS SYSTEM", the complete application of which is hereby incorporated by reference, which application is also a Continuation-In-Part of U.S. patent application Ser. No. 08/002,467 filed Jan. 8, 1993, now U.S. Pat. No. 5,452,289, entitled "COMPUTER-BASED MULTIFUNCTION PERSONAL COMMUNICATIONS SYSTEM", the complete application of which, including the microfiche appendix, is also hereby incorporated by reference.

FIELD OF THE INVENTION

The present invention relates to communications systems and in particular to systems for switching between voice communications and computer assisted digital communications having a voice over data communications ability.

BACKGROUND OF THE INVENTION

A wide variety of communications alternatives are currently available to telecommunications users. For example, facsimile transmission of printed matter is available through what is commonly referred to as a stand-alone fax machine. Alternatively, fax-modem communication systems are currently available for personal computer users which combine the operation of a facsimile machine with the word processor of a computer to transmit documents held on computer disk. Modem communication over telephone lines in combination with a personal computer is also known in the art where file transfers can be accomplished from one computer to another. Also, simultaneous voice and modem data transmitted over the same telephone line has been accomplished in several ways.

Modem technology has recently multiplexed the transmission of various nonstandard data with standard digital data, such as voice over data communications, creating a hybrid datastream of voice and digital data.

One problem associated with voice over data communications occurs when two users initiate an analog voice connection and subsequently wish to initiate digital data or voice over data communications. One method to initiate digital data or voice over data communications is to terminate the analog voice connection and re-connect in a digital data or voice over data format, however, this is inconvenient and requires hanging up and redialing between the users.

A time-division multiplexing voice and data communication system which switches between a "SYSTEM mode" and a "POTS mode" was proposed in U.S. Pat. No. 4,740,963 by Eckley, entitled "VOICE AND DATA COMMUNICATION SYSTEM". In SYSTEM mode a multiplexer means time-division multiplexes a compressed, digitized analog voice signal with a digital data signal to produce a composite digital signal having a data rate substantially equal to the uncompressed, digitized voice signal. The POTS mode is the analog voice mode. A remote user unit switches to the SYSTEM mode upon receipt of a particular dual-tone multifrequency (DTMF) signal from a remote digital loop carrier unit. The Eckley system returns to POTS mode upon detection of a failure of a remote user unit or upon detection of a particular code from a central office terminal. The Eckley invention requires a special mode tone detector to generate a control signal to enter SYSTEM mode and a code detection circuit to detect the particular code to return to POTS mode. However, the Eckley system is designed to operate in a particular voice and data time-division multiplexing system.

Packetized voice over data communication systems utilize several communication parameters not found in fixed time-division multiplexing systems and require negotiation of packet transmission parameters, such as speech compression ratio and speech algorithm selection.

Therefore, there is a need in the art for a mode switching control for a packetized voice over data communications which provides a plurality of switching means for transferring between an analog voice connection and digital data communications or voice over data communications without having to hang up on the original analog voice connection. The mode switching control should provide means for negotiating digital data and voice over data communications parameters.

SUMMARY OF THE INVENTION

The present disclosure describes a complex computer assisted communications system, the details of which are set forth in the above-mentioned U.S. patent application Ser. No. 08/346,421, now U.S. Pat. No. 5,546,395, entitled "DYNAMIC SELECTION OF COMPRESSION RATE FOR A VOICE COMPRESSION ALGORITHM IN A VOICE OVER DATA MODEM" by Sharma et al., filed Nov. 29, 1994, the complete application of which was incorporated by reference and in the above-mentioned U.S. patent application Ser. No. 08/002,467, now U.S. Pat. No. 5,452,289, filed Jan. 8, 1993 entitled "COMPUTER-BASED MULTIFUNCTION PERSONAL COMMUNICATIONS SYSTEM", the complete application of which, including the microfiche appendix, was also incorporated by reference.

The subject of the present invention includes a mode switching system for establishing a digital data communications or a voice over data communications from an existing analog voice connection. Alternate embodiments include means for negotiation of communications parameters for digital data communications and for digital voice over data communications. Embodiments are also described for returning to analog voice communications after completing digital data communications or voice over data communications.

The major functions of the present system are a telephone function, a voice mail function, a fax manager function, a multi-media mail function, a show and tell function, a terminal function and an address book function. The telephone function is more sophisticated than a standard telephone in that the present system converts the voice into a digital signal which can be processed with echo cancellation, compressed, stored as digital data for later retrieval and transmitted as digital voice data concurrent with the transfer of digital information data.

The voice over data (show and tell) component of the present system enables the operator to simultaneously transmit voice and data communication to a remote site. This voice over data function dynamically allocates data bandwidth over the telephone line depending on the demands of the voice grade digitized signal.

A modified supervisory packet is described which can be used to negotiate digital data communication parameters or voice over data communications parameters. In one embodiment, the modified supervisory packet negotiates nonstandard data transmission parameters, such as the speech compression algorithm and speech compression ratio, in voice over data communications. By using a supervisory packet the need for escape sequences is obviated and data transmission parameter negotiation occurs without an interruption in the transmission of data. In addition, data transmission parameters can be renegotiated and changed in real time throughout the data transmission. This method may also be employed for negotiation of standard communications parameters or protocols.

DESCRIPTION OF THE DRAWINGS

In the drawings, where like numerals describe like components throughout the several views.

DETAILED DESCRIPTION OF THE PREFERRED EMBODIMENTS

In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

Figure 1:
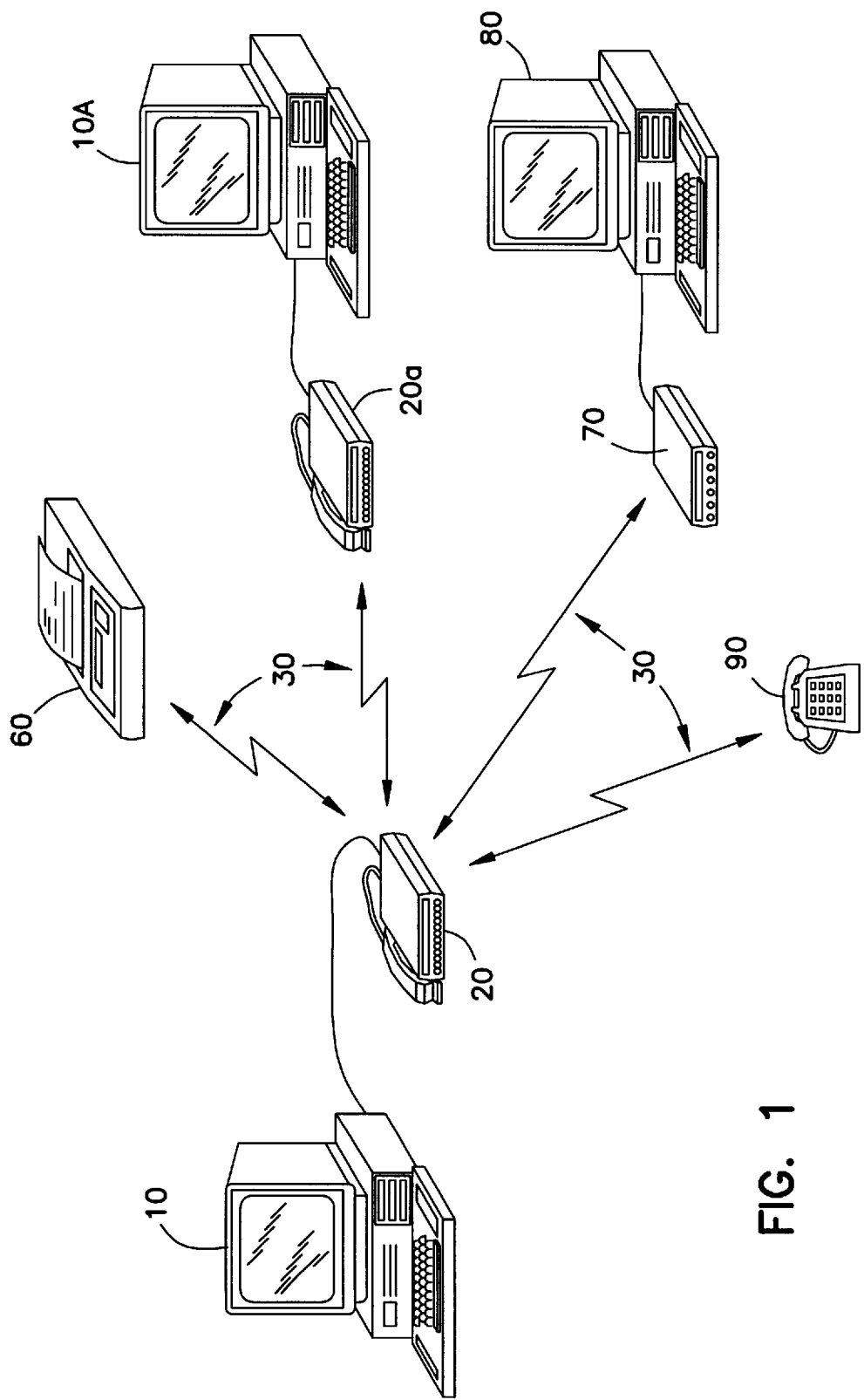
FIG. 1 shows the telecommunications environment within which the present system may operate in several of the possible modes of communication.

FIG. 1 shows a typical arrangement for the use of the present system. Personal computer 10 is running the software components of the present system while the hardware components 20 include the data communication equipment and telephone headset. Hardware components 20 communicate over a standard telephone line 30 to one of a variety of remote sites. One of the remote sites may be equipped with the present system including hardware components 20a and software components running on personal computer 10a. In one alternative use, the local hardware components 20 may be communicating over standard telephone line 30 to facsimile machine 60. In another alternative use, the present system may be communicating over a standard telephone line 30 to another personal computer 80 through a remote modem 70. In another alternative use, the present system may be communicating over a standard telephone line 30 to a standard telephone 90. Those skilled in the art will readily recognize the wide variety of communication interconnections possible with the present system by reading and understanding the following detailed description.

The ornamental features of the hardware components 20 of FIG. 1 are claimed as part of Design Patent Application Number 29/001368, filed Nov. 12, 1992 entitled "Telephone/Modem case for a Computer-Based Multifunction Personal Communications System" assigned to the same assignee of the present inventions and hereby incorporated by reference.

General Overview

The present inventions are embodied in a commercial product by the assignee, MultiTech Systems, Inc. The software component operating on a personal computer is sold under the commercial trademark of MultiExpressPCS™ personal communications software while the hardware component of the present system is sold under the commercial name of MultiModemPCS™, Intelligent Personal Communications System Modem. In the preferred embodiment, the software component runs under Microsoft® Windows® however those skilled in the art will readily recognize that the present system is easily adaptable to run under any single or multi-user, single or multi-window operating system.

The present system is a multifunction communication system which includes hardware and software components. The system allows the user to connect to remote locations equipped with a similar system or with modems, facsimile machines or standard telephones over a single analog telephone line. The software component of the present system includes a number of modules which are described in more detail below.

Figure 2:
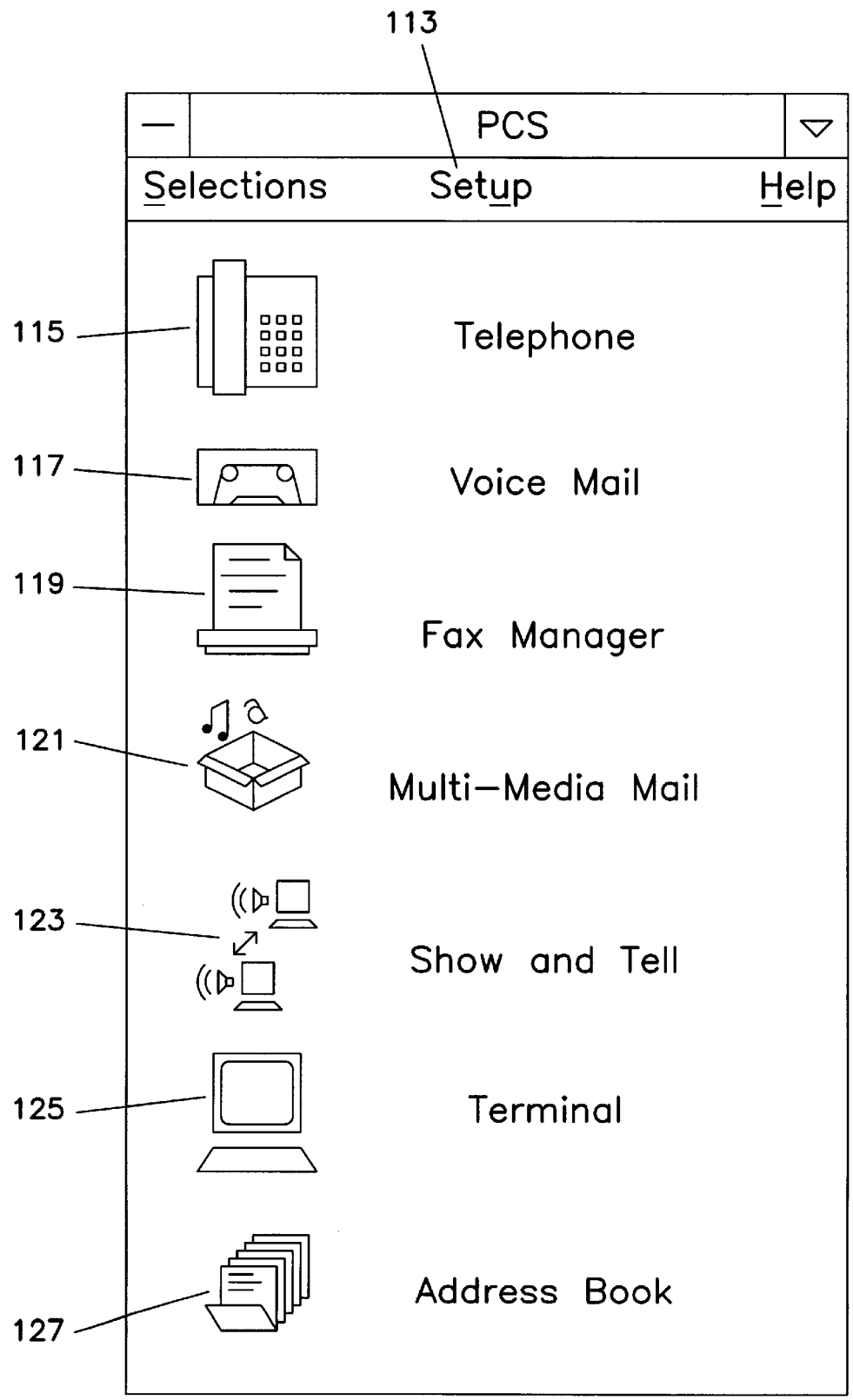
FIG. 2 is the main menu icon for the software components operating on the personal computer.

FIG. 2 is an example of the Windows®-based main menu icon of the present system operating on a personal computer. The functions listed with the icons used to invoke those functions are described in the above-mentioned U.S. patent application Ser. No. 08/002,467 filed Jan. 8, 1993 entitled "COMPUTER-BASED MULTIFUNCTION PERSONAL COMMUNICATIONS SYSTEM". Those skilled in the art will readily recognize that a wide variety of selection techniques may be used to invoke the various functions of the present system. The icon of FIG. 2 is part of Design Patent Application Number 29/001397, filed Nov. 12, 1992 entitled "Icons for a Computer-Based Multifunction Personal Communications System" assigned to the same assignee of the present inventions and hereby incorporated by reference.

Hardware Components

Figure 3:
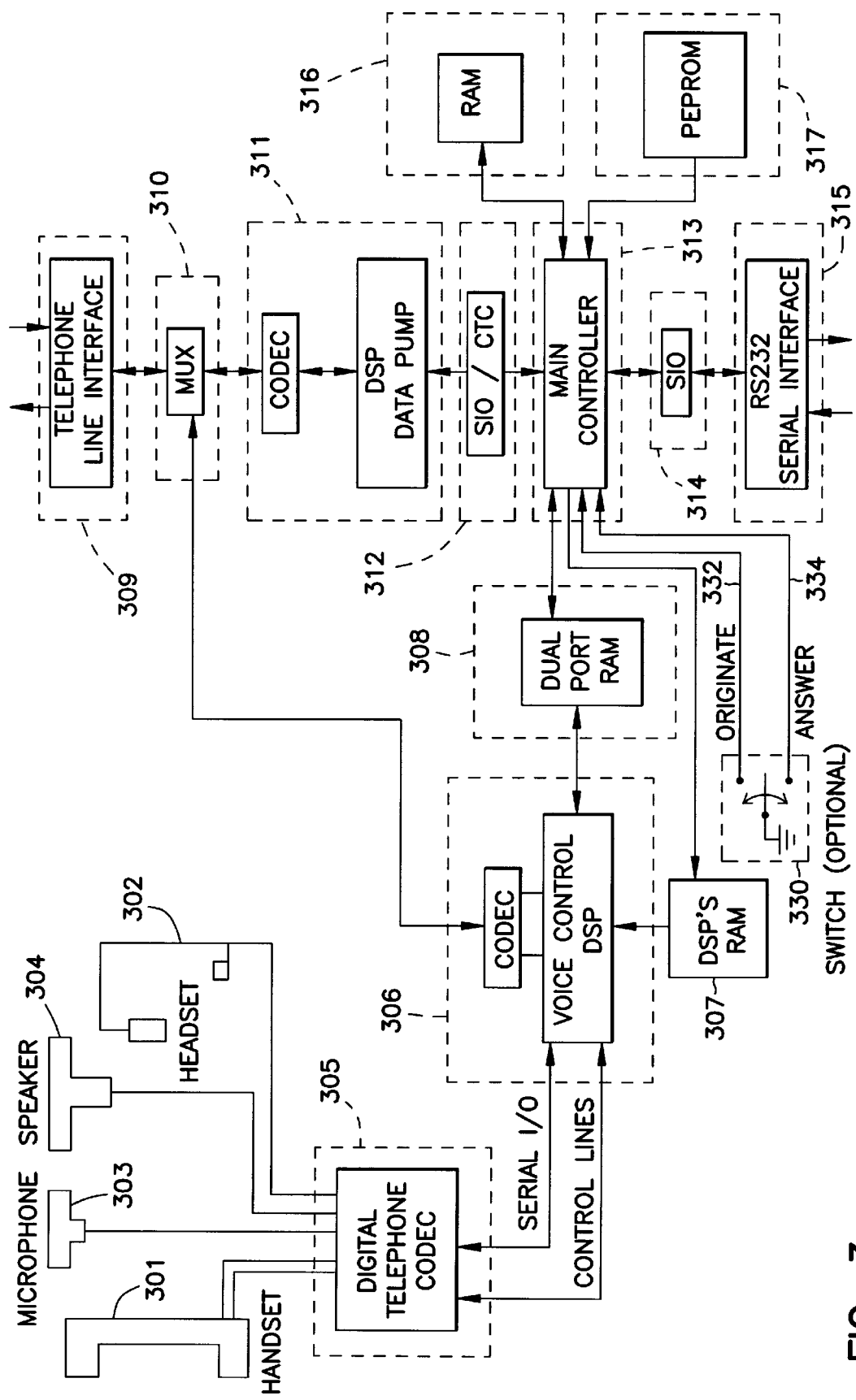
FIG. 3 is a block diagram of the hardware components of the present system.

FIG. 3 is a block diagram of the hardware components of the present system corresponding to reference number 20 of FIG. 1. These components form the link between the user, the personal computer running the software component of the present system and the telephone line interface. The details of the system shown in FIG. 3 and a detailed description of the schematics is found in the above-mentioned U.S. patent application Ser. No. 08/002,467 filed Jan. 8, 1993 entitled "COMPUTER-BASED MULTIFUNCTION PERSONAL COMMUNICATIONS SYSTEM".

In the preferred embodiment of the present system three alternate telephone interfaces are available: the telephone handset 301, a telephone headset 302, and a hands-free microphone 303 and speaker 304. Regardless of the telephone interface, the three alternative interfaces connect to the digital telephone coder-decoder (CODEC) circuit 305.

The digital telephone CODEC circuit 305 interfaces with the voice control digital signal processor (DSP) circuit 306 which includes a voice control DSP and CODEC. This circuit does digital to analog (D/A) conversion, analog to digital (A/D) conversion, coding/decoding, gain control and is the interface between the voice control DSP circuit 306 and the telephone interface. The CODEC of the voice control circuit 306 transfers digitized voice information in a compressed format to multiplexor circuit 310 to analog telephone line interface 309.

The CODEC of the voice control circuit 306 is an integral component of a voice control digital signal processor integrated circuit. The voice control DSP of circuit 306 controls the digital telephone CODEC circuit 305, performs voice compression and echo cancellation.

Multiplexor (MUX) circuit 310 selects between the voice control DSP circuit 306 and the data pump DSP circuit 311 for transmission of information on the telephone line through telephone line interface circuit 309.

The data pump circuit 311 also includes a digital signal processor (DSP) and a CODEC for communicating over the telephone line interface 309 through MUX circuit 310. The data pump DSP and CODEC of circuit 311 performs functions such as modulation, demodulation and echo cancellation to communicate over the telephone line interface 309 using a plurality of telecommunications standards including FAX and modem protocols.

The main controller circuit 313 controls the DSP data pump circuit 311 and the voice control DSP circuit 306 through serial input/output and clock timer control (SIO/CTC) circuits 312 and dual port RAM circuit 308 respectively. The main controller circuit 313 communicates with the voice control DSP 306 through dual port RAM circuit 308. In this fashion digital voice data can be read and written simultaneously to the memory portions of circuit 308 for high speed communication between the user (through interfaces 301, 302 or 303/304) and the personal computer connected to serial interface circuit 315 and the remote telephone connection connected through the telephone line attached to line interface circuit 309.

In one embodiment, the main controller circuit 313 includes a microprocessor which controls the functions and operation of all of the hardware components shown in FIG. 3. The main controller is connected to RAM circuit 316 and an programmable and electrically erasable read only memory (PEROM) circuit 317. The PEROM circuit 317 includes non-volatile memory in which the executable control programs for the voice control DSP circuits 306 and the main controller circuits 313 operate.

The RS232 serial interface circuit 315 communicates to the serial port of the personal computer which is running the software components of the present system. The RS232 serial interface circuit 315 is connected to a serial input/output circuit 314 with main controller circuit 313. SIO circuit 314 is in the preferred embodiment, a part of SIO/CTC circuit 312.

Functional Operation of the Hardware Components

Referring once again to FIG. 3, the multiple and selectable functions described in conjunction with FIG. 2 are all implemented in the hardware components of FIG. 3. Each of these functions is discussed in the above-mentioned U.S. patent application Ser. No. 08/002,467 filed Jan. 8, 1993 entitled "COMPUTER-BASED MULTIFUNCTION PERSONAL COMMUNICATIONS SYSTEM".

The voice portion of the voice over data transmission of the show and tell function is accomplished by receiving the user's voice through the telephone interface 301, 302 or 303 and the voice information is digitized by the digital telephone circuit 305. The digitized voice information is passed to the voice control circuit 306 where the digitized voice information is compressed using a voice compression algorithm as described in the above-mentioned U.S. patent application Ser. No. 08/002,467 filed Jan. 8, 1993 entitled "COMPUTER-BASED MULTIFUNCTION PERSONAL COMMUNICATIONS SYSTEM". The digitized and compressed voice information is passed through dual port RAM circuit 308 to the main controller circuit 313. During quiet periods of the speech, a quiet flag is passed from voice control circuit 306 to the main controller 313 through a packet transfer protocol described below by a dual port RAM circuit 308.

Simultaneous with the digitizing compression and packetizing of the voice information is the receipt of the packetized digital information from the personal computer over interface line circuit 315 by main controller circuit 313.

The transmission of the digital data follows the CCITT V.42 standard, as is well known in the industry and as described in the CCITT Blue Book, volume VIII entitled Data Communication over the Telephone Network, 1989. The CCITT V.42 standard is hereby incorporated by reference. The voice data packet information also follows the CCITT V.42 standard, but uses a different header format so the receiving site recognizes the difference between a data packet and a voice packet. The voice packet is distinguished from a data packet by using undefined bits in the header (80 hex) of the V.42 standard.

Since the voice over data communication with the remote site is full-duplex, incoming data packets and incoming voice packets are received by the hardware components of FIG. 3. The incoming data packets and voice packets are received through the telephone line interface circuit 309 and passed to the main controller circuit 313 via data pump DSP circuit 311. The incoming data packets are passed by the main controller circuit 313 to the serial interface circuit 315 to be passed to the personal computer. The incoming voice packets are passed by the main controller circuit 313 to the dual port RAM circuit 308 for receipt by the voice control DSP circuit 306. The voice packets are decoded and the compressed digital information therein is uncompressed by the voice control DSP of circuit 306. The uncompressed digital voice information is passed to digital telephone CODEC circuit 305 where it is reconverted to an analog signal and retransmitted through the telephone line interface circuits. In this fashion full-duplex voice and data transmission and reception is accomplished through the hardware components of FIG. 3 during the show and tell functional operation of the present system.

Terminal operation 125 of the present system is also supported by the hardware components of FIG. 3. Terminal operation means that the local personal computer simply operates as a "dumb" terminal including file transfer capabilities. Thus no local processing takes place other than the handshaking protocol required for the operation of a dumb terminal. In terminal mode operation, the remote site is assumed to be a modem connected to a personal computer but the remote site is not necessarily a site which is configured according to the present system. In terminal mode of operation, the command and data information from personal computer is transferred over the RS232 serial interface circuit 315, forwarded by main controller circuit 313 to the data pump circuit 311 where the data is placed on the telephone line via telephone line interface circuit 309.

In a reciprocal fashion, data is received from the telephone line over telephone line interface circuit 309 and simply forwarded by the data pump circuit 311, the main controller circuit 313 over the serial line interface circuit 315 to the personal computer.

Packet Protocol Overview

Specific details on packet protocol are found in the above-mentioned U.S. patent application Ser. No. 08/002,467 filed Jan. 8, 1993 entitled "COMPUTER-BASED MULTIFUNCTION PERSONAL COMMUNICATIONS SYSTEM".

A special packet protocol is used for communication between the hardware components 20 and the personal computer (PC) 10. The protocol is used for transferring different types of information between the two devices such as the transfer of DATA, VOICE, and QUALIFIED information.

In one embodiment there are 3 types of packets used: DATA, VOICE, and QUALIFIED. A Data Packet is used for normal data transfer between the controller 313 of hardware component 20 and the computer 10 for such things as text, file transfers, binary data and any other type of information presently being sent through modems. All packet transfers begin with a synch character 01 hex (synchronization byte). The Data Packet begins with an ID byte which specifies the packet type and packet length.

The Voice Packet is used to transfer compressed VOICE messages between the controller 313 of hardware component 20 and the computer 10. The Voice Packet is similar to the Data Packet except for its length which is, in one embodiment, currently fixed at 23 bytes of data. Once again, all packets begin with a synchronization character chosen in the preferred embodiment to be 01 hex (01H). The ID byte of the Voice Packet is completely a zero byte: all bits are set to zero.

The Qualified Packet is used to transfer commands and other non-data/voice related information between the controller 313 of hardware component 20 and the computer 10 and start with a synchronization character chosen in one embodiment to be 01 hex (01H). A Qualified Packet starts with two bytes where the first byte is the ID byte and the second byte is the QUALIFIER type identifier.

In order to determine the status of the cellular link, a supervisory packet is also used. Both sides of the cellular link will send the cellular supervisory packet every 1 to 3 seconds. Upon receiving the cellular supervisory packet, the receiving side will acknowledge it using the ACK field of the cellular supervisory packet. If the sender does not receive an acknowledgement within one second, it will repeat sending the cellular supervisory packet up to 12 times. After 12 attempts of sending the cellular supervisory packet without an acknowledgement, the sender will disconnect the line. Upon receiving an acknowledgement, the sender will restart its 3 second timer. Those skilled in the art will readily recognize that the timer values and wait times selected here may be varied without departing from the spirit or scope of the present invention.

A modified supervisory packet was described in detail in the above-mentioned U.S. patent application Ser. No. 08/271,496 filed Jul. 7, 1994 entitled "VOICE OVER DATA MODEM WITH SELECTABLE VOICE COMPRESSION". The modified supervisory packet was described as an independent communications channel. One example demonstrated the use of a modified supervisory packet in the negotiation of nonstandard communication parameters. For instance, the modified supervisory packet is used to negotiate speech algorithm selection and speech compression ratios. Other examples were given, and those given here are not intended in a limiting or exclusive sense.

Detailed Description of a Mode Switching System

Figure 4:
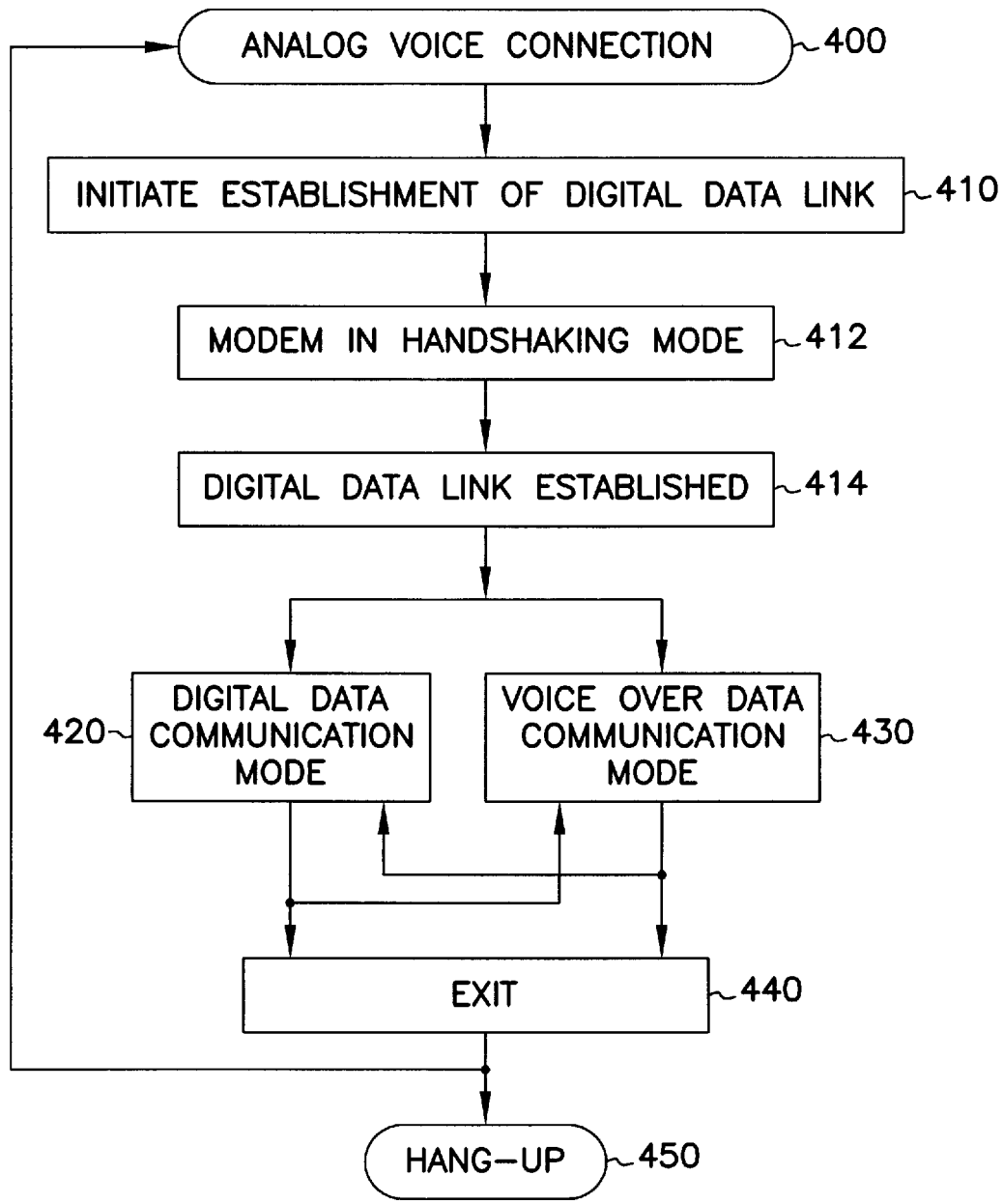
FIG. 4 is a flow diagram showing the steps for initiating digital data communications and voice over data communications from an established analog voice connection according to one embodiment of the present invention.

Referring again to FIG. 1, consider the case where a first user on modem 20 has established analog voice communications with a second user at remote modem 20a. As shown in FIG. 4, the first user and second user may wish to establish either digital data communications or voice over data communications without terminating the existing analog voice telephone connection. The term "digital data link" will be used to describe the digital link established to commence either a digital data communications mode, a voice over data communications mode, or a combination of the two modes. In digital data communications mode the modem transmits digital data and in voice over data communications mode the modem transmits multiplexed packetized voice and data packets. The termination of the digital data link results in an exit by hang up or by return to analog voice mode.

As illustrated in FIG. 4, the users begin in the analog voice mode 400 and a digital data link is initiated 410 by the method and apparatus described herein. After handshaking mode is complete 412 the digital data link is established 414. Depending on the particular application the users may enter a digital data communications mode 420, a voice over data communications mode 430, or a sequential combination of the two modes, as shown in FIG. 4. The users may exit 440 by hanging up the telephone lines 450 or by reentering analog voice mode 400.

Throughout this description the numberings shown in FIG. 3 shall be used to indicate the components of modem 20, and similar numbering shall be used to indicate modem 20a by attaching an "a" suffix to each component of FIG. 3. For example, the main controller of modem 20 is controller 313, whereas the main controller of modem 20a is controller 313a (not shown).

Switching Systems for Establishing The Digital Data Link

In one embodiment of the present invention the first user and the second user establish the digital data link by pressing a hardwired switch 330 located on modem 20 and a similar switch 330a located on modem 20a, at approximately the same time. Switch 330 is shown in FIG. 3 as one means for initiating digital data link. To ensure consistent handshaking, the users have predetermined which one will be the originating modem and which one will be the answering modem. Controller 313 determines whether its modem is originating or answering based on whether it receives an originate signal 332 or an answer signal 334, as predetermined by the users. Controller 313 of modem 20 detects when the switch 330 is pressed by the first user and controller 313a of modem 20a detects when the switch 330a is pressed by the second user. Both modems 20 and 20a execute software to establish a digital link through handshaking protocols specified in CCITT v-series modem protocols (some examples are v.22, v.22bis, v.32 and v.34 protocols).

In another embodiment the users initiate digital data communications by a software switch which is selected from a menu of options displayed on computers 10 and 10a, respectively. The software switch also contains options for each user to select their originating or answer status.

Figure 5:
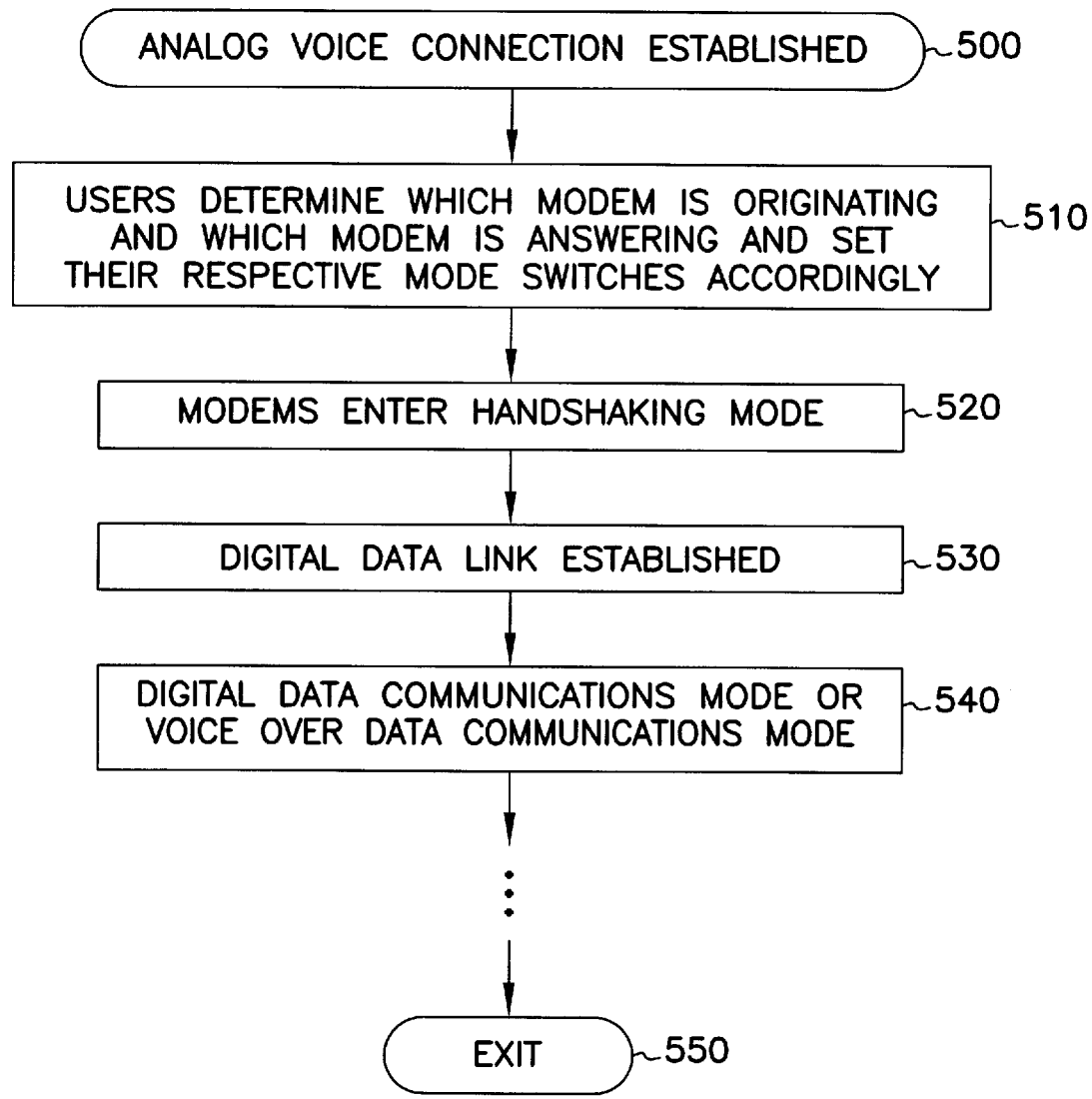
FIG. 5 is a flow diagram showing the steps for one example of establishing a digital data link with user controlled mode switches according to one embodiment of the present invention.

As shown in FIG. 5, an analog voice connection is established 500 and when both modems detect the pressed switches 330 and 330a, the modems are placed in handshaking mode. The designation of originating modem and answering modem is predefined by the users before entering into handshaking mode 510. After handshaking is completed 520 the digital data link is established 530 and the modems may enter either the digital data communications mode for digital data transfer or the voice over data communications mode for multiplexed voice and data packet transfer 540. The exit routines 550 will be discussed in further detail below (see FIG. 10).

Figure 6:
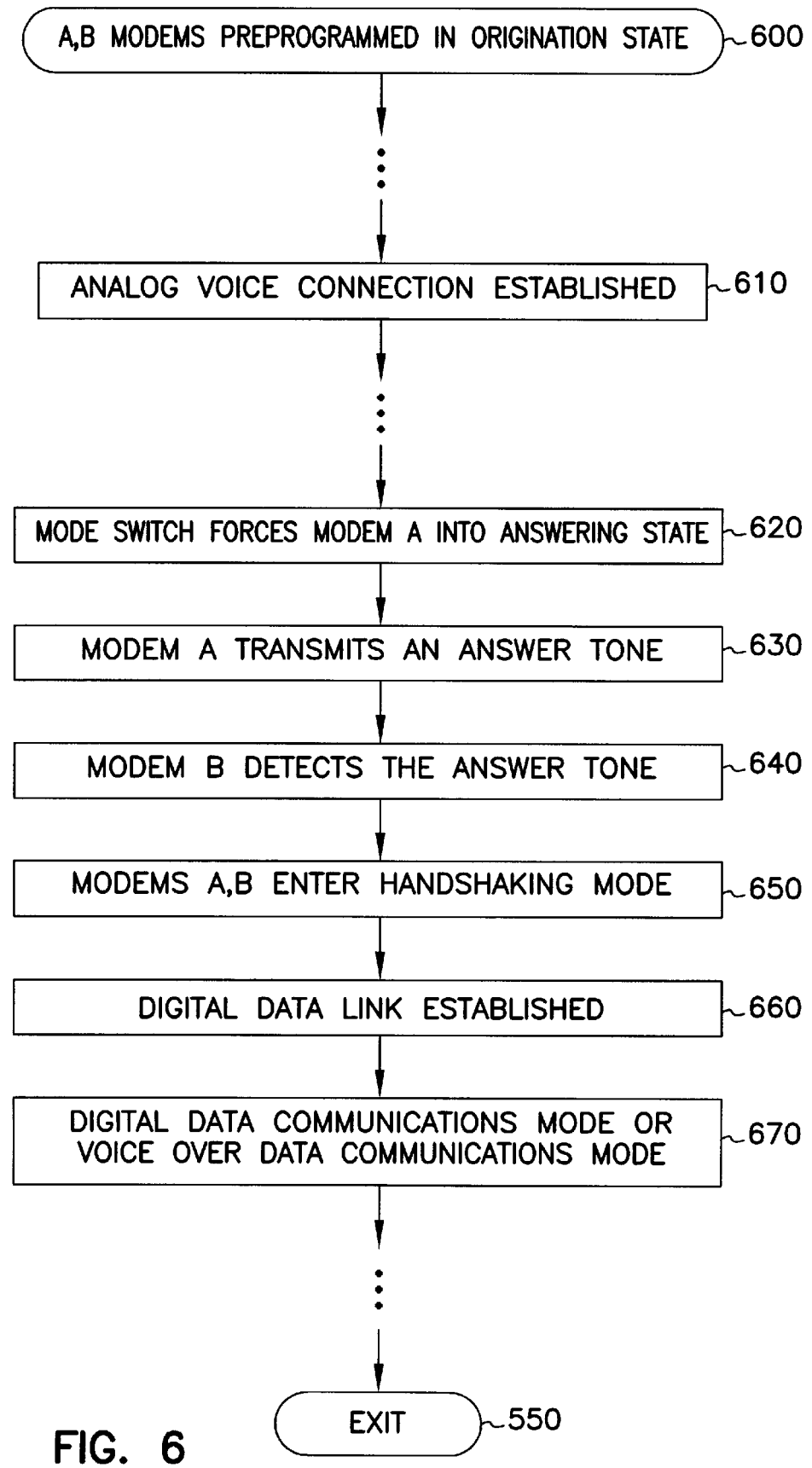
FIG. 6 is a flow diagram showing the steps for one example of establishing a digital data link using an answer tone according to one embodiment of the present invention.

In yet another embodiment, as shown in FIG. 6 the switch between analog voice mode and the digital data link modes is accomplished using a switching signal. Both modems are preprogrammed to idle in an origination state 600 prior to the analog voice connection 610 and both modems have a hardware mode switch to force the modem into an answer state 620. When both modems are in the origination state the analog voice communications are conducted normally and without interruption. If the hardware switch is depressed on one of the modems, that modem (e.g., modem A) will enter an answer mode and transmit an answer tone, which is used as a switching signal 630. The answer tone is detected by the modem which is still in origination mode (modem B) 640 and the originating modem and the answering modem handshake with the originator/answer designation forced by the user depressing the hardware mode switch 650. The digital link is thereby established 660 and digital data communications and voice over data communications are operable 670.

Figure 7:
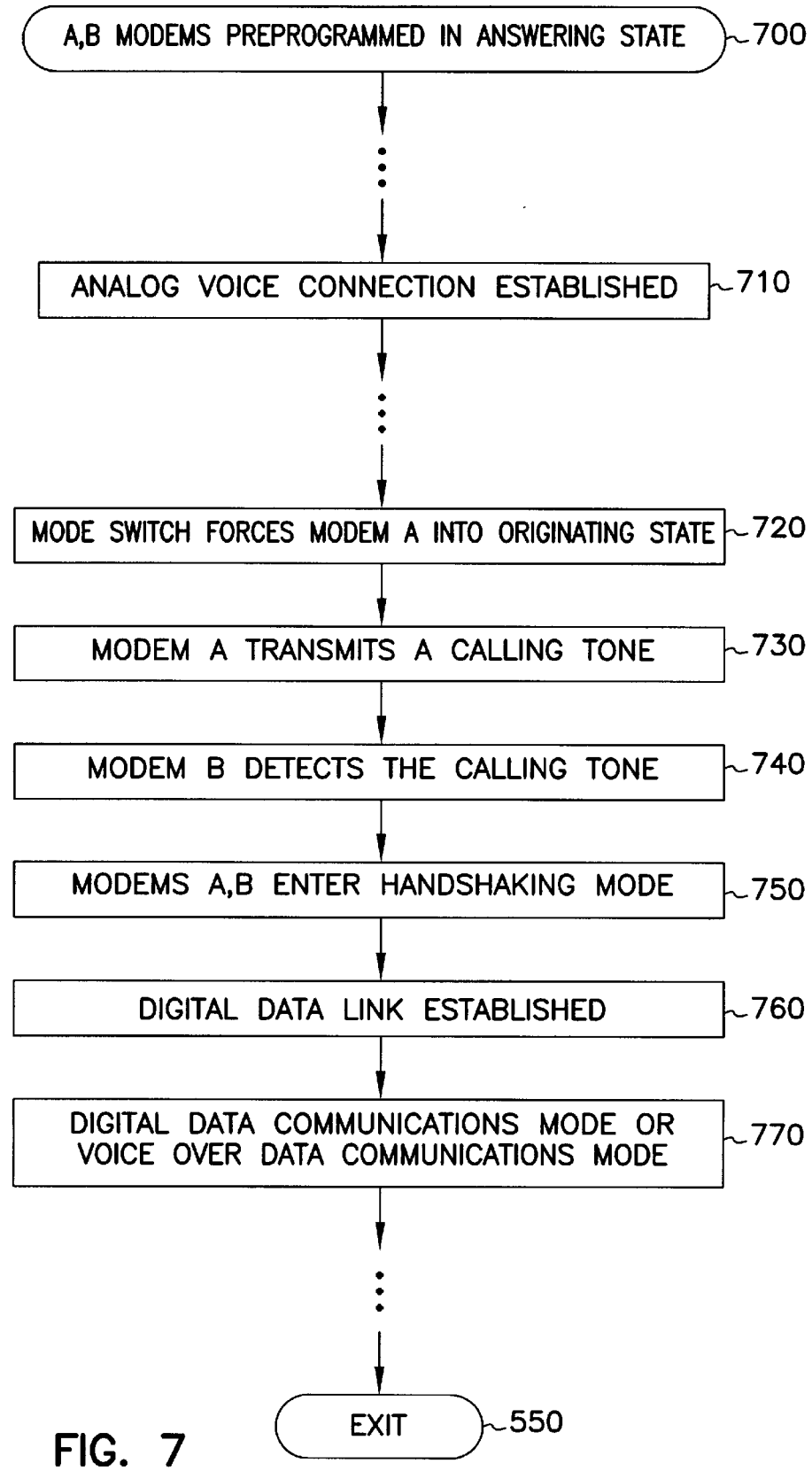
FIG. 7 is a flow diagram showing the steps for one example of establishing a digital data link using a calling tone according to one embodiment of the present invention.

As shown in FIG. 7, a variation of this embodiment occurs when both modems idle in the answer state 700 and the mode switch is used to force one of the modems into an originator mode 720. The originating modem thereby transmits a calling tone which is used as a switching signal 730. The answering modem detects the calling tone and responds with an answering tone 740, and the modems handshake 750 with the originator/answer designation forced by the hardware mode switch. The digital link is thereby established 760 and digital data communications and voice over data communications are operable 770.

Figure 8:
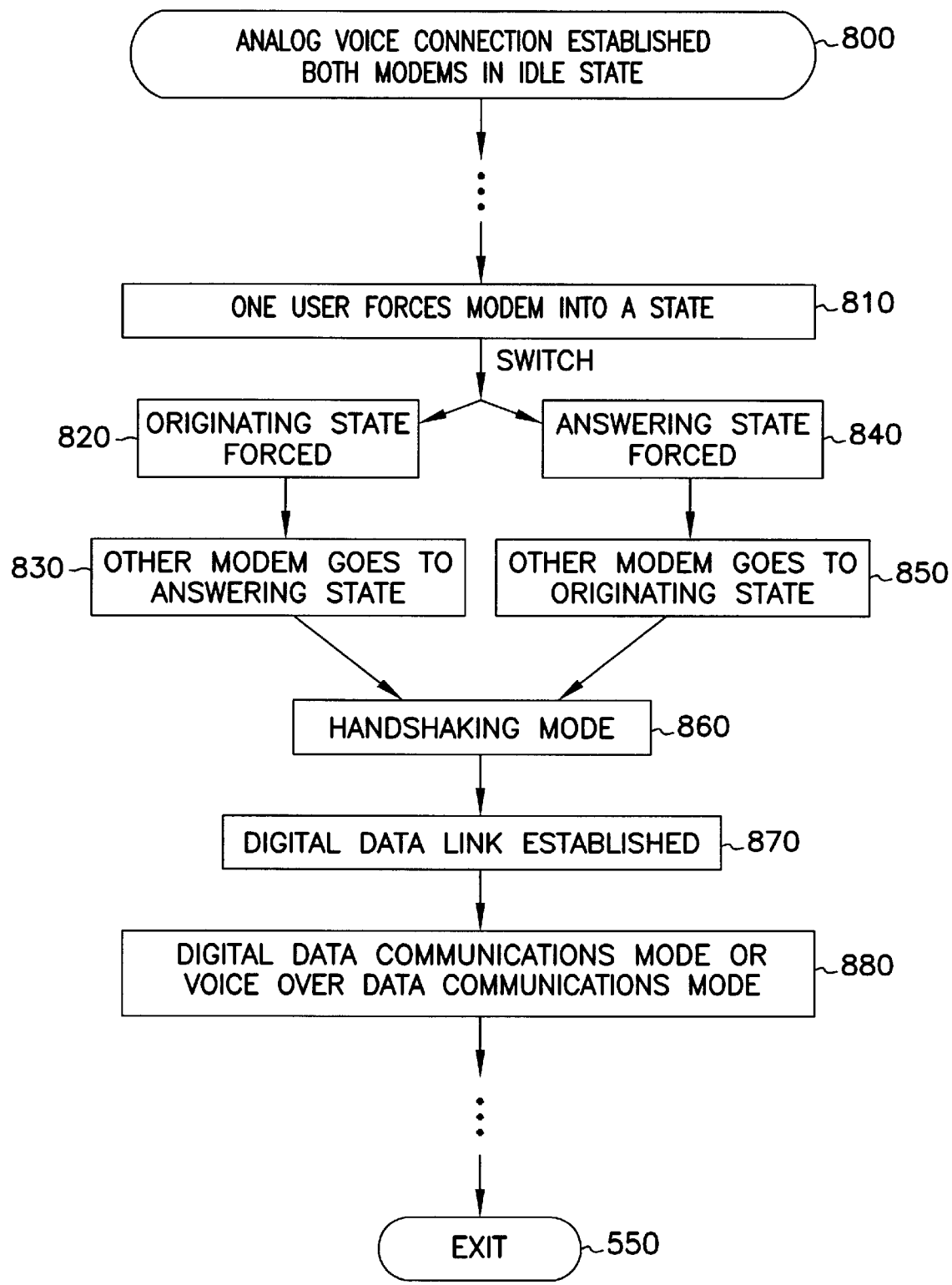
FIG. 8 is a flow diagram showing the steps for one example of establishing a digital data link requiring only a single user controlled mode switch according to one embodiment of the present invention.

In yet another embodiment the modems are idling with a software routine designed to poll telephone line interface 309 in order to detect transmission of a predetermined switching tone sent from another modem. Both modems include a mode switch that has both an origination and an answer mode selection. FIG. 8 shows that when a user depresses the mode switch to force one modem into the origination mode 810 and 820, the other modem detects the calling signal generated by that originating modem and the resident software forces the second modem into an answering mode 830. In this case the mode signal is the calling signal. If the user depresses the mode switch to force the first modem into the answering mode the first modem generates an answer tone which is the switching signal 840. The answer tone is decoded by the second modem and the software on the second modem forces that modem into an origination mode 850.

The last three embodiments eliminate the need for both operators to predetermine which modem will be originating and which modem will be answering. It also provides the users with the ability to unilaterally establish a digital data link.

In one embodiment the answer tone is a 2100 Hz tone and the calling tone is a 1300 Hz tone. Those skilled in the art will readily recognize that other tone frequencies and audio signals may be used as switching signals without departing from the scope and spirit of the present invention. For example, a dual-tone multifrequency (DTMF) tone may be substituted for the switching tone. Another example incorporates the use of a sequence of DTMF tones to be decoded as a mode switching signal, in place of a single switching tone.

In one embodiment, both modems are preprogrammed to monitor telephone line interface 309 in order to detect the switching tone using codec/DSP 311. In another embodiment the switching tone is detected using DSP 306. Alternate embodiments include signal debouncing means to eliminate accidental triggering of the modems into the handshake mode.

In an alternate embodiment the mode switch is actually a software switch, which is operated by the user at the terminal attached to the modem.

Those skilled in the art will readily recognize that other methods of initiating the digital data link may be substituted for the methods described herein without departing from the spirit and scope of the present invention, and the methods taught herein are not intended in a limiting or exclusive sense.

Establishing Digital Data Communications Using ATD/ATA Commands

Figure 9:
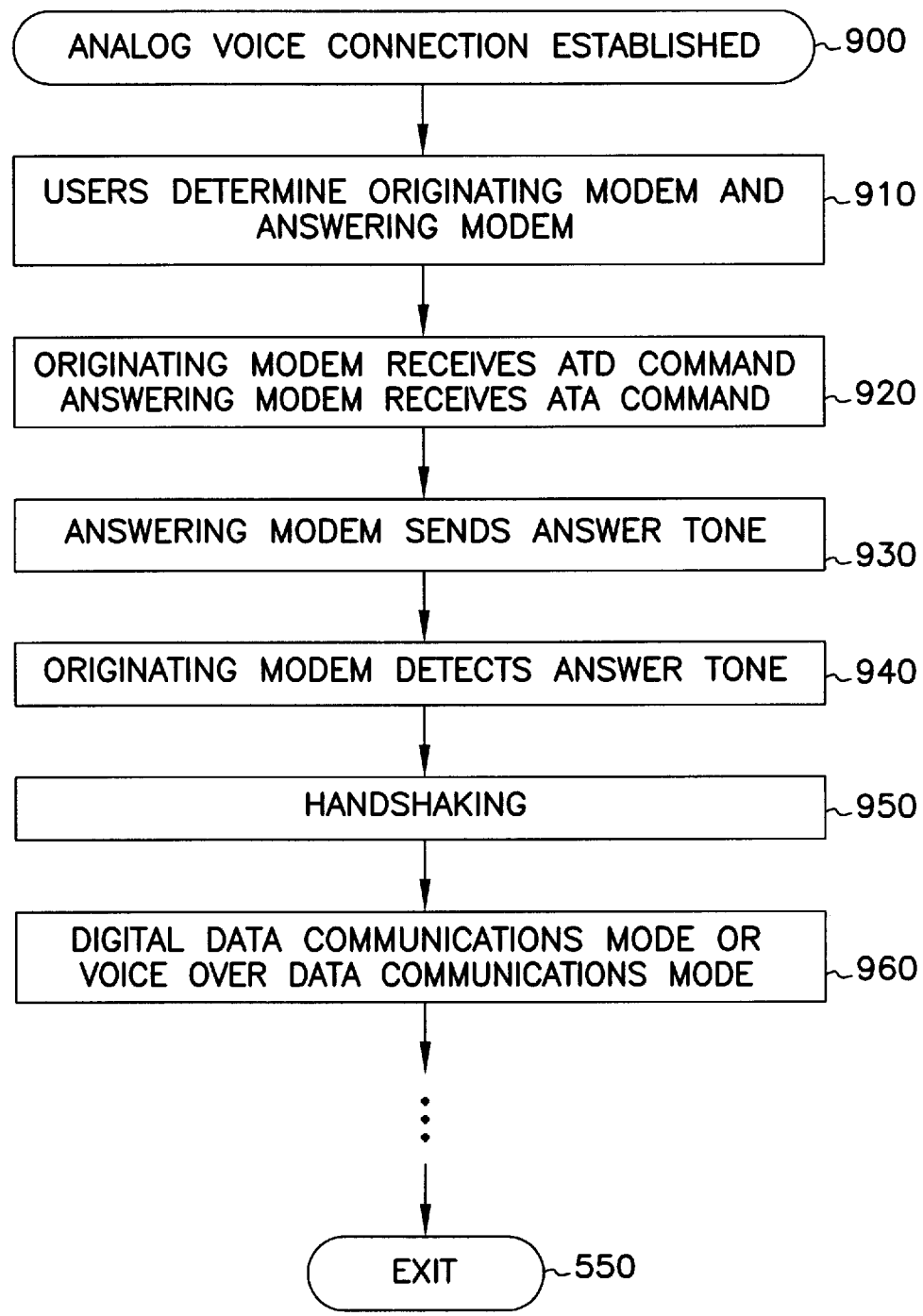
FIG. 9 is a flow diagram showing the steps for one example of establishing a digital data link using ATD/ATA commands according to one embodiment of the present invention.

One embodiment provides a digital data link between modems 20 and 20a by the use of ATD and ATA modem commands to place the modems in the handshaking mode. This method and apparatus does not require hardware switches 330 or 330a, but does require that both users predetermine which will be an originating modem and which will be an answering modem, as shown in FIG. 9, step 910. When the first user and second user desire a digital data link, one of the users will transmit to its respective modem an ATD (dialing) command 920. The other user will transmit an ATA (answering) command to its respective modem 920. Transmission of these commands may be initiated with either a software command or a hardware switching device which generates the ATD/ATA commands and transfers the appropriate command to their respective modems.

If, for example, the first user transmits the ATD command to modem 20 then controller 313 of modem 20 receives the command and places modem 20 in answering mode. In this example, an ATA command is issued to modem 20a which places modem 20a in handshaking mode and initiates an answer tone 930. Modem 20, which is in the origination mode, receives the answer tone generated by modem 20a and initiates digital data communications through handshaking according to CCITT v-series modem protocols 940, 950. In one embodiment the modems establish communication parameters during handshaking. Some of the communications parameters negotiated include baud rate and digital data protocols. Those skilled in the art will readily recognize that other protocols may be substituted without departing from the scope and spirit of this embodiment of the present invention. In an alternate embodiment parameter negotiation is performed by the modified supervisory packet as described in the above-mentioned U.S. patent application Ser. No. 08/271,496 filed Jul. 7, 1994 entitled "VOICE OVER DATA MODEM WITH SELECTABLE VOICE COMPRESSION".

Establishing Voice Over Data Communications Using ATD/ATA Commands

In one embodiment voice over data communications are performed by establishing the digital data link as described above and then incorporating a supervisory packet to signal the voice over data communications mode as described in the copending U.S. patent application Ser. No. 08/142,801 filed Oct. 25, 1993 entitled "RINGDOWN AND RINGBACK SIGNALLING FOR A COMPUTER-BASED MULTIFUNCTION PERSONAL COMMUNICATIONS SYSTEM", which was incorporated by reference, above.

In a second embodiment, establishment of the digital data link may automatically invoke the voice over data communications mode which additionally incorporates advanced priority statistical multiplexing (APSM). APSM is described in the copending U.S. patent application Ser. No. 08/349,505 filed Dec. 2, 1994 entitled "VOICE OVER DATA CONFERENCING FOR A COMPUTER-BASED PERSONAL COMMUNICATIONS SYSTEM", which is hereby incorporated by reference. APSM allows the digital link to use as much bandwidth for voice as is necessary, and the remaining bandwidth is dynamically allocated to digital data communications, thus, eliminating the need to switch between digital data transmission mode and a voice over data transmission mode.

Yet another embodiment switches between the digital data communications mode and the voice over data communications mode by using special mode switching codes transmitted by the users of the modems 20 and 20a after the digital link is established.

After the voice over data communications link is established, the modem 20a may negotiate communications parameters such as speech compression ratio and voice algorithm selection using the modified supervisory packet as detailed in the above-mentioned U.S. patent application Ser. No. 08/271,496 filed Jul. 7, 1994 entitled "VOICE OVER DATA MODEM WITH SELECTABLE VOICE COMPRESSION".

One Example of Establishing The Digital Data Link Using Calling Tones

Alternate methods and apparatus may be employed to switch from voice analog mode to digital data communications mode or voice over data communications mode. For example, in one embodiment, if modem 20 is the originating modem and modem 20a is the answering modem a 1300 Hz calling tone is used to initiate transfer from analog voice mode to digital communications mode. The originating modem (modem 20 in this instance) is programmed to transmit a 1300 Hz calling tone to originate contact with an answering modem and codec/DSP 311 is programmed to detect the 2100 Hz answer tone received from the answering modem (modem 20a in this instance). When both users wish to establish the digital data link, the originating modem (20) transmits the 1300 Hz calling tone and the answering modem (20a) transmits a 2100 Hz answering tone, which is detected by the originating modem (20). Upon detection of the answering tone, the originating modem and the answering modem begin handshaking to establish the digital data link.

Other audible tones may be substituted without departing from the scope and spirit of the present invention and other hardware may be configured to detect the audible signal. For example, in an alternate embodiment the codec/DSP of the originating modem is preprogrammed to detect the 2100 Hz calling tone. In yet another embodiment, a dedicated detector is added to the hardware to detect the answering tone and signal the modem electronics that a digital link is being initiated.

In an alternate embodiment, both modems are constantly monitoring their respective telephone line interfaces (309 and 309a) using codec/DSP (311 and 311a) to detect an audio calling signal. This allows one modem to initiate the data link; both users need not instruct their modems to establish the digital data link Additional codes are used to place the modems in digital data communications mode or voice over data communications mode after the digital link is established. The APSM system described in the previous section entitled "Establishing Voice Over Data Communications Using ATD/ATA Commands" automatically switches between digital data communications mode and voice over data communications mode according to the data being transferred between the modems. The modified supervisory packet also discussed in that section provides an additional communications channel and enables negotiation of communications parameters as described above via the supervisory packet.

One Example of Establishing The Digital Data Link Using DTMF Tones

Specialized DTMF tones may be used to initiate the establishment of the digital data link while in analog voice mode. In one embodiment the user manually enters a predetermined DTMF tone from the telephone keypad during the analog voice connection to initiate establishment of the digital link. In another embodiment, a DTMF tone sequence is detected to switch from analog voice mode to digital data link mode. In yet another embodiment, the modem software is preprogrammed dial the numbers in order to generate the DTMF tone sequence. For example, in one embodiment to initiate digital data communications data pump DSP circuit 311 is preprogrammed to recognize a special DTMF tone sequence which initiates the establishment of the digital data link between the originating and answering modems.

For example, if the special DTMF tone sequence is represented by a particular dialing sequence, for instance, 5-5-6-2, then the user initiates the digital data link by pressing touch tone buttons 5-5-6-2 in the proper sequence during the analog voice mode. These numbers represent the DTMF tones decoded by the answering modem to begin modem handshaking.

Speech Recognition Mode Switching

One skilled in the art will readily recognize that other signalling techniques may be employed without departing from the scope and spirit of the present invention. For example, in one embodiment nonstandard signalling, such as speech recognition, is incorporated into digital signal processor 306. DSP 306 is preprogrammed to learn and recognize verbal commands which are issued by a first operator to enter digital data communications mode or voice over data communications mode. The commands may be understood by both the local modem and the remote site modem since both modems are connected to a common analog voice connection. The commands are executed automatically upon recognition by DSPs 306. In another embodiment codec/DSP 312 monitors telephone line interface 309 to detect predetermined voice commands to establish digital data communications and voice over data communications.

Establishing Facsimile Mode Using Facsimile Tone

Yet another embodiment incorporates an 1100 Hz facsimile audible tone for switching from analog voice mode to facsimile mode. The detection of the 1100 Hz facsimile signal is accomplished by monitoring telephone line interface 309 using codec/DSP 311 and switching to facsimile mode upon signal detection.

Exiting Digital Data Communications

Figure 10:
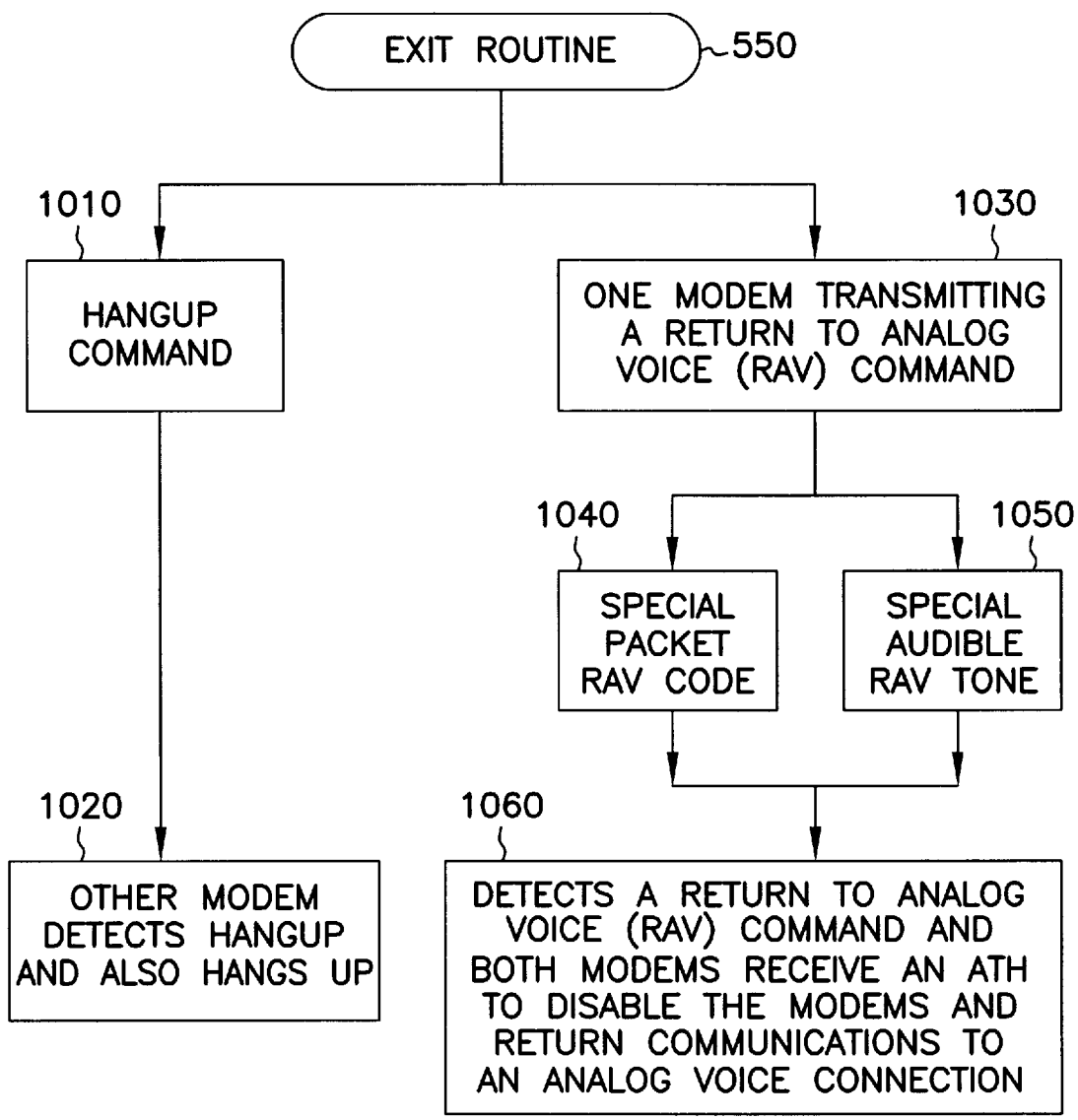
FIG. 10 is a flow diagram showing a sequence of steps to exit a digital data communications mode and a voice over data communications mode according to one embodiment of the present invention.

As shown in FIG. 10, in one embodiment of the present invention exit from the digital data link 550 is performed digitally, by encoding a special a Hangup Command Packet 1010. In another embodiment, an exit command 1030 is performed using the supervisory packet with a Return to Analog Voice Mode (RAV) command 1040 to signal end of digital communications. In an alternate embodiment a special RAV audible tone is generated to signal return to analog voice mode and disable the modems 1050, 1060.

The present inventions are to be limited only in accordance with the scope of the appended claims, since others skilled in the art may devise other embodiments still within the limits of the claims.

We claim:

1. A communication module for use with a personal computer, comprising:

communications interface means connected for communicating to the personal computer for transferring data between the personal computer and the communications module;

communication line interface means for connection to a communication line and for full duplex digital communication over the communication line and for analog communication over the communication line;

voice interface means for receiving local voice signals from a local user and for conveying remote voice signals from a remote user to the local user;

full-duplex conversion means connected to the voice interface means for converting the local voice signals into outgoing digital voice data and for converting incoming digital voice data into the remote voice signals;

digital signal processor means connected to the full-duplex conversion means and operable in a first mode for compressing the outgoing digital voice data into compressed outgoing digital voice data packets and for decompressing compressed incoming digital voice data packets into the incoming digital voice data, each of the compressed outgoing digital voice data packets having headers and each of the compressed incoming digital voice data packets having headers;

the digital signal processor means further operable in a second mode for converting the outgoing digital voice data into outgoing analog voice signals and for converting incoming analog voice signals into the incoming digital voice data;

main control means connected to the communication line interface means, connected for receiving the compressed outgoing digital voice data packets from the digital signal processor means, connected for receiving outgoing computer digital data packets from the personal computer through the communications interface means, and operable in the first mode for multiplexing the compressed outgoing digital voice data packets and the computer digital data packets to produce multiplexed outgoing data and for sending the multiplexed outgoing data to the communication line interface means for transmission over the communication line;

the main control means further operable in the first mode for receiving multiplexed incoming data from the communication line interface means, the multiplexed incoming data containing incoming computer digital data packets multiplexed with the compressed incoming digital voice data packets, the main control means further operable for demultiplexing the incoming computer digital data packets and the compressed incoming digital voice data packets, and for sending the incoming computer digital data packets to the personal computer through the communications interface means and for sending the compressed incoming digital voice data packets to the digital signal processor means; and mode switching means operable in the first mode for transferring the multiplexed incoming data from the communication line interface means to the main control means and for transferring the multiplexed incoming data from the main control means to the communication line interface means;

the mode switching means operable in the second mode for transferring the outgoing analog voice signals from the digital signal processor means to the communication line interface means and for transferring the incoming analog voice signals from the communication line interface means to the digital signal processor means.

2. The communication module of claim 1 wherein the mode switching means uses a calling tone for switching between the first mode and the second mode.

3. The communication module of claim 1 wherein the mode switching means uses an answer tone for switching between the first mode and the second mode.

4. The communication module of claim 1 wherein the mode switching means uses a dual-tone multifrequency signal for switching between the first mode and the second mode.

5. The communication module of claim 1 wherein the mode switching means uses modem dialing and modem answering commands for switching between the first mode and the second mode.

6. The communication module of claim 1 wherein the mode switching means comprises speech recognition means for switching between the first mode and the second mode based on verbal commands.

7. A method for switching between voice only communication and simultaneous voice-data communication between two sites, comprising:

establishing analog voice communications between a first communication module and a second communication module capable of packet communications;

providing digital data packets each having a header;

providing voice data packets each having a header;

producing a mode switch signal from the first communication module;

detecting the mode switch signal in the second communication module; and switching from analog communications to fill-duplex communications in response to the mode switch signal wherein the voice data packets and the digital packets are multiplexed and transmitted between the two sites.

8. The method of claim 7 wherein producing a mode switch signal comprises producing a calling tone signal.

9. The method of claim 7 wherein producing a mode switch signal comprises producing an answer tone signal.

10. The method of claim 7 wherein producing a mode switch signal comprises producing a dual tone multifrequency signal.

11. A method for switching between voice only communication and simultaneous voice-data communication between two sites, comprising:

establishing analog voice communications between a first communication module and a second communication module capable of packet communications;

producing a mode switch signal from the first communication module;

detecting the mode switch signal in the second communication module; and switching from analog communications to full-duplex multiplexed voice and data packet communications in response to the mode switch signal;

wherein producing a mode switch signal comprises providing speech recognition means and producing a mode switch signal based on verbal commands received by the speech recognition means.

* * * * *

UNITED STATES PATENT AND TRADEMARK OFFICE
CERTIFICATE OF CORRECTION

PATENT NO.: 5,864,560
DATED: Jan. 26, 1999
INVENTOR(S): Li et al.

It is certified that error appears in the above-identified patent and that said Letters Patent is hereby corrected as shown below:

Front Page, [63] Related U.S. Application Data, please delete "Feb. 3" and insert --Dec. 3--;

Front Page, [63] Related U.S. Application Data, please delete "142,087, Oct. 28, 1993, Pat. No. 5,450,320" and insert --142,807, Oct. 25, 1993, Pat. No. 5,535,204--;

Page 3, Foreign Patent Documents, please delete "0 60 286 A2" and insert --0 650 286 A2--;

Column 1, line 21, please delete "Feb." and insert --Dec.--;

Column 1, line 28, please delete "08/142,087 filed Oct. 28, 1993, now U.S. Pat. No. 5,450,320" and insert --08/142,807 filed Oct. 25, 1993, now U.S. Pat. No. 5,535,204--;

Column 15, line 18, please delete "fill-duplex" and insert --full-duplex--.

Signed and Sealed this

First Day of May, 2001

Attest:

NICHOLAS P. GODICI

*Attesting Officer*     *Acting Director of the United States Patent and Trademark Office*